(12) United States Patent
Garrett

(10) Patent No.: US 11,363,082 B2
(45) Date of Patent: Jun. 14, 2022

(54) VIDEO CONFERENCE TELEPRESENCE CONTROLLER

(71) Applicant: Peter Garrett, Santa Cruz, CA (US)

(72) Inventor: Peter Garrett, Santa Cruz, CA (US)

( * ) Notice: Subject to any disclaimer, the term of this patent is extended or adjusted under 35 U.S.C. 154(b) by 0 days.

(21) Appl. No.: 16/914,346

(22) Filed: Jun. 27, 2020

(65) Prior Publication Data

US 2021/0409465 A1 Dec. 30, 2021

(51) Int. Cl.
*H04L 65/4038* (2022.01)
*H04N 7/15* (2006.01)
*G10L 15/30* (2013.01)
*G06V 20/40* (2022.01)

(52) U.S. Cl.
CPC .......... *H04L 65/4038* (2013.01); *G06V 20/41* (2022.01); *G10L 15/30* (2013.01); *H04N 7/152* (2013.01); *G06V 20/44* (2022.01)

(58) Field of Classification Search
CPC combination set(s) only.
See application file for complete search history.

(56) References Cited

U.S. PATENT DOCUMENTS

| | | | |
|---|---|---|---|
| 2009/0220064 A1* | 9/2009 | Gorti | H04M 3/568 379/202.01 |
| 2016/0255126 A1* | 9/2016 | Sarris | H04N 7/155 348/14.08 |
| 2016/0337510 A1* | 11/2016 | Li | H04M 3/2227 |
| 2017/0351951 A1* | 12/2017 | Santos | G06F 16/90324 |
| 2018/0131805 A1* | 5/2018 | Byrne | H04M 1/72552 |
| 2020/0028807 A1* | 1/2020 | Akama | G06F 40/20 |
| 2020/0304643 A1* | 9/2020 | Abraham | H04M 3/562 |
| 2020/0314483 A1* | 10/2020 | Rakshit | H04N 7/141 |

* cited by examiner

*Primary Examiner* — Phung-Hoang J Nguyen

(57) ABSTRACT

A video conference telepresence controller includes a first set of instructions commanding a server to create and maintain a queue structure for clients of a video conference telepresence session, a second set of instructions commanding the server to monitor audio/video feeds of the clients of the video conference telepresence sessions and identify the clients of those feeds, a third set of instructions commanding the server to detect precursor events to a session disturbance or flow interruption in one or more of the monitored feeds and flagging the feeds harboring the events for action, and a fourth set of instructions commanding the server to perform an interruption, redirect, or deletion of the one or more feeds and for providing notification thereof to one or more clients.

10 Claims, 6 Drawing Sheets

VIDEO CONFERENCE TELEPRESENCE CONTROLLER

CROSS-REFERENCE TO RELATED DOCUMENTS

[NA]

BACKGROUND OF THE INVENTION

1. Field of the Invention

The present invention is in the field of Internet Protocol Network Telephony (IPNT), more particularly network-based video conferencing tools and pertains to methods and apparatus for moderating a video conference session to eliminate cross talk, speaker interruptions or disturbances and other potential obstructions to concerted dialog.

2. Discussion of the State of the Art

In the art of computer integrated telephone (CIT) telephony conferencing has evolved from dedicated land line connected audio bridging of two or more communicating parties to Internet based telepresence conferencing systems using software based conferencing bridges or room space enabling audio and video conferencing for remote operators using video conference software and services provided by companies like Zoom, Star to Star, Go to Meeting, and others.

Platforms like Zoom are based on a telephony server and operated on the Internet network and provide a telepresence experience as if all the parties are in a same meeting space or room sitting around a conference table. These telepresense systems are mostly adapted for individuals who work from home, teaching remote students, or having a sales meeting or board meeting.

More recently, these telepresense applications are being used further in situations that are forced to be remote by a virus or contagion like COVD-19, which is occurring at the time of this writing. For example, airing or broadcasting television presentations or musical presentations created in real time or before airing by remote contributors that are forced to perform remotely, or real time applications such as having a remote high school graduation, or holding political debates or government sessions where the parties cannot gather without increasing danger of transmission of the contagion.

All these situations described above have differing formats of conduct and include different aspects of visual and audio sharing. Therefore, much effort and modification may be required to mitigate challenging circumstances that might take away from or even obstruct the goals of the telepresence session. Mitigating circumstances include bandwidth for access and participation, content compression (video), audio signal delays (latency), signal synchronization (audio/video), and problems involved in communication order such as cross talk, interrupting, third party noise or distractions, and so on.

Therefore, what is clearly needed is a video conference telepresence controller that may mitigate live content and communication order challenges to create a more ordered and efficient experience.

BRIEF SUMMARY OF THE INVENTION

According to an embodiment of the present invention, a video conference telepresence controller is provided as a first set of coded instructions written on a non-transitory medium coupled to a server on a network, the first set of instructions commanding the server to create and maintain a queue structure for clients of a video conference telepresence session, a second set of coded instructions written on the non-transitory medium, the second set of instructions commanding the server to monitor audio/video feeds received at the server of the clients of the video conference telepresence session hosted by the server and to identify the clients of those feeds, a third set of coded instructions written on the non-transitory medium, the third set of instructions commanding the server to detect precursor events to a session disturbance or flow interruption in one or more of the monitored feeds based on knowledge of queue state and rules, flagging the feeds harboring the events for action, and a fourth set of coded instructions written on the non-transitory medium, the fourth set of instructions commanding the server to perform an interruption, redirect, or deletion of the one or more feeds flagged for action under the third set of instructions and for providing notification thereof to one or more clients.

In one embodiment, the controller has access to one or more optical recognition technologies for detecting visual precursor events, and one or more speech detection and recognition technologies for detecting audio precursor events. In one embodiment, the network is the Internet network including any connected sub-networks. In one embodiment, the queue structure is a virtual queue structure generally following first-in-first-out (FIFO) queue protocols. In one embodiment, the queue structure has a time limit for time in queue. In one embodiment the queue structure is dynamic and built before or during an active telepresence session.

In one implementation, one of the clients participating in session is a session moderator. In one implementation, a precursor event is a client talking out of turn based on queue state and session rules. In one embodiment, a precursor event is a client displaying an alternative visual to the client profile out of turn based on queue state and session rules. In one embodiment of the invention, moderator may override actions taken by the controller. In one embodiment, interruption of one or more flagged feeds is performed by cancelling the feed or feeds broadcast back onto the network to the clients in session.

In one embodiment, redirection of one or more flagged feeds is performed by rerouting the feed to a separate database for logging and canceling the feed or feeds relative to broadcast back over the network to client devices. In this embodiment, the data logged over time teaches the controller a pattern and may serve as knowledge to improve the accuracy of the controller.

DETAILED DESCRIPTION OF THE INVENTION

In various embodiments described in enabling detail herein, the inventor provides a unique system for mitigating potential disruption and disorder in a telepresence video/audio conference session. The present invention is described using the following examples, which may describe more than one relevant embodiment falling within the scope of the invention.

Figure 1:
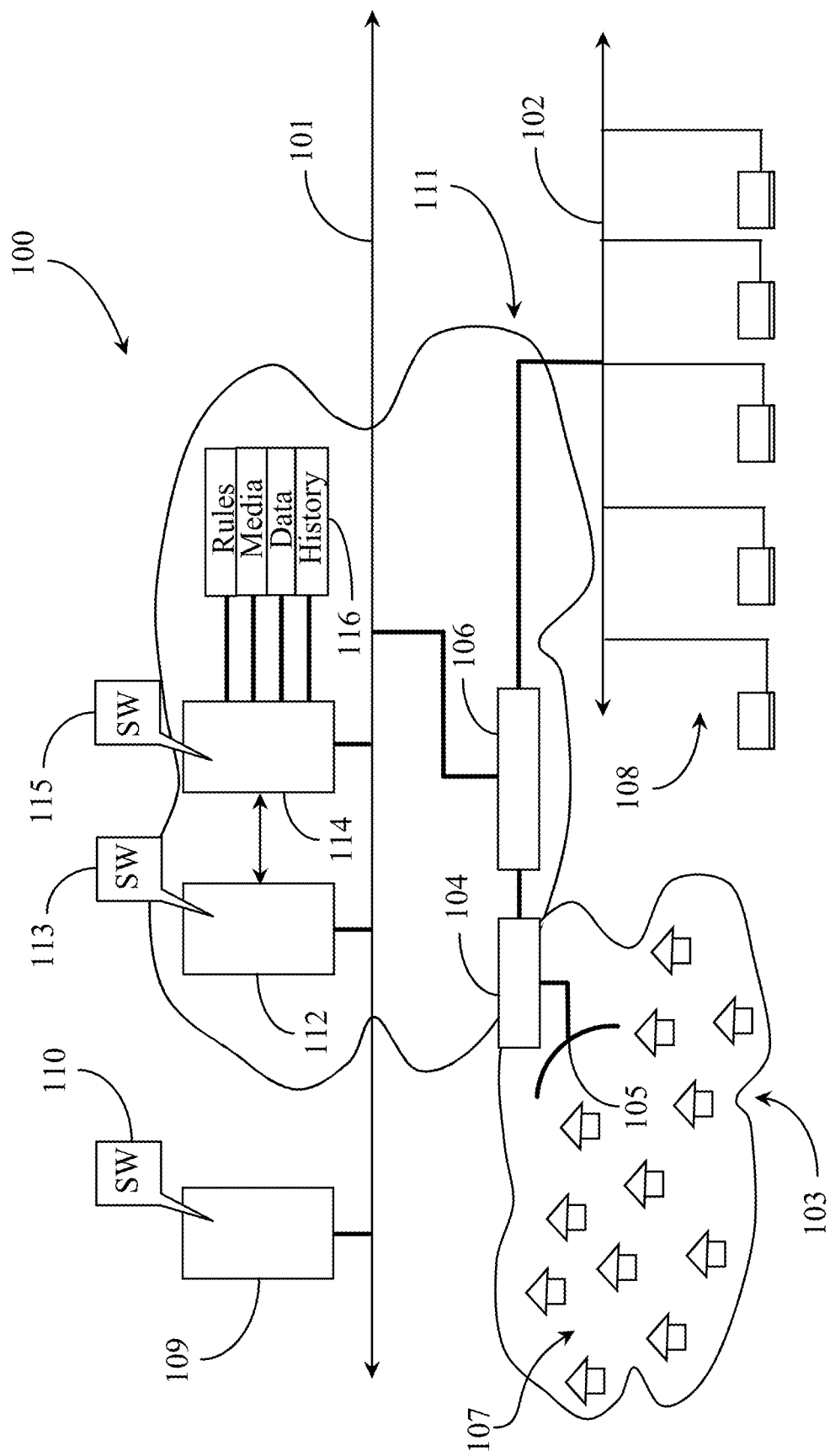
FIG. 1 is an architectural overview 100 of a network supporting telepresence telephony according to an embodiment of the present invention.

FIG. 1 is an architectural overview of a network 100 supporting telepresence telephony according to an embodiment of the present invention. Network 100 may be the well-known Internet network in a preferred embodiment. Network 100 may also be a corporate wide area network (CWAN) without departing from the spirit and scope of the present invention. A network backbone 101 may represent all the lines, equipment, and access points making up the Internet network including any connected sub networks.

Network 100 may be accessed through a sub-network like a wireless communications network 103. Wireless network 103 may be a wireless cellular network with access to network backbone 101 through a wireless gateway 104 adapted with a wireless signal receiver 105 having a wired connection to an edge router 106. Wireless access may be provided through any Internet service provider offering wireless Internet access. Clients 107 may practice video teleconferencing from their wireless devices that are adapted with display capability for wireless video/audio telephony.

Internet backbone 101 is accessible through a wired sub-network depicted herein by a network backbone 102. Sub-network 102 may be a corporate local area network (CLAN) like an Ethernet LAN, for example. Clients 108 may practice video teleconferencing from Ethernet connected devices such as laptop computers adapted for video/audio telephony.

Network backbone 101 supports a web server 109 adapted to server Web pages to clients. Server 109 may host a Website 110 that serves as a contact point for clients 107 and 108 to visit and to download a video teleconference application for use in video/audio teleconferencing. WS 110 may be owned or leased by a company that provides teleconferencing applications and technical support.

In one embodiment, network backbone 111 supports an Internet based data storage and server system in the form of a cloud network 111. Cloud network 111 is not required to practice the present invention but may be a common resource that service providers may use to build up capacity for servicing lager numbers of clients 103 and 108 practicing video telephony from a remote location or from remote groups.

Cloud network 111 includes a server 112 connected to backbone 101. Server 112 is adapted as a video teleconference server and includes software (SW) 113 adapted to broker video/audio teleconferencing in real time over the network. Server 112 has connection to a back-end sever 114 adapted handle various aspects of communications between clients 107 and 108 via a software application 115. SW 115 enables server 114 to perform among other tasks, real time mitigation of undesired interruptions or Impedance that may occur in server-brokered or bridged video teleconference sessions conducted in real time on the Internet represented by network backbone 101 in this embodiment.

Back-end server 114 has data connections to one or more data repositories 116 that may include data storage space for telepresence video conference rules, associated media, associated data, and interaction or session history that may be saved and mined for additional information to improve artificial intelligence associated with mitigating undesired interruptions or impedance of a video/audio telepresence video conference session.

In use of the present invention, potential user of the video conference system may visit Website 110 running on Web server 109 and may download a client application adapted to facilitate their experience in a VC telepresence session of remote users or clients such as clients 107 and 108. A client may then schedule a session with server 112 running SW 113, which may broker a session with the aid of artificial intelligence (AI) built into SW 115 hosted on back-end server 114.

At session time, clients may log into sessions brokered on server 112 in cloud network 111. Video and audio of clients is received at server 112 and broadcast to all of the other logged in clients so every client may see and hear all the other participants, SW 113 may support a software teleconference bridge and a participation queue structure that may be a first-in first-out (FIFO) queue structure. It is noted herein that the number of participants and number of queue slots may be predicted or set up intentionally for any created teleconference session.

Back-end server 114 aided by SW 115 handles media storage and service and may make predetermination based on video/audio feed analysis of all clients in session that a mitigating task may be required in session that includes mooting audio and video redistribution of a client feed in session. The term moot is used in this sense to mean redirecting, making useless, or otherwise preventing other clients from seeing video or hearing audio. Other tasks may also be performed where notifications may be generated and distributed to certain clients in session where those notifications provide knowledge of actions performed in an automated fashion by the system to mitigate potential disturbances or interruptions in communication sequences occurring in real time in session with multiple participants.

Figure 2:
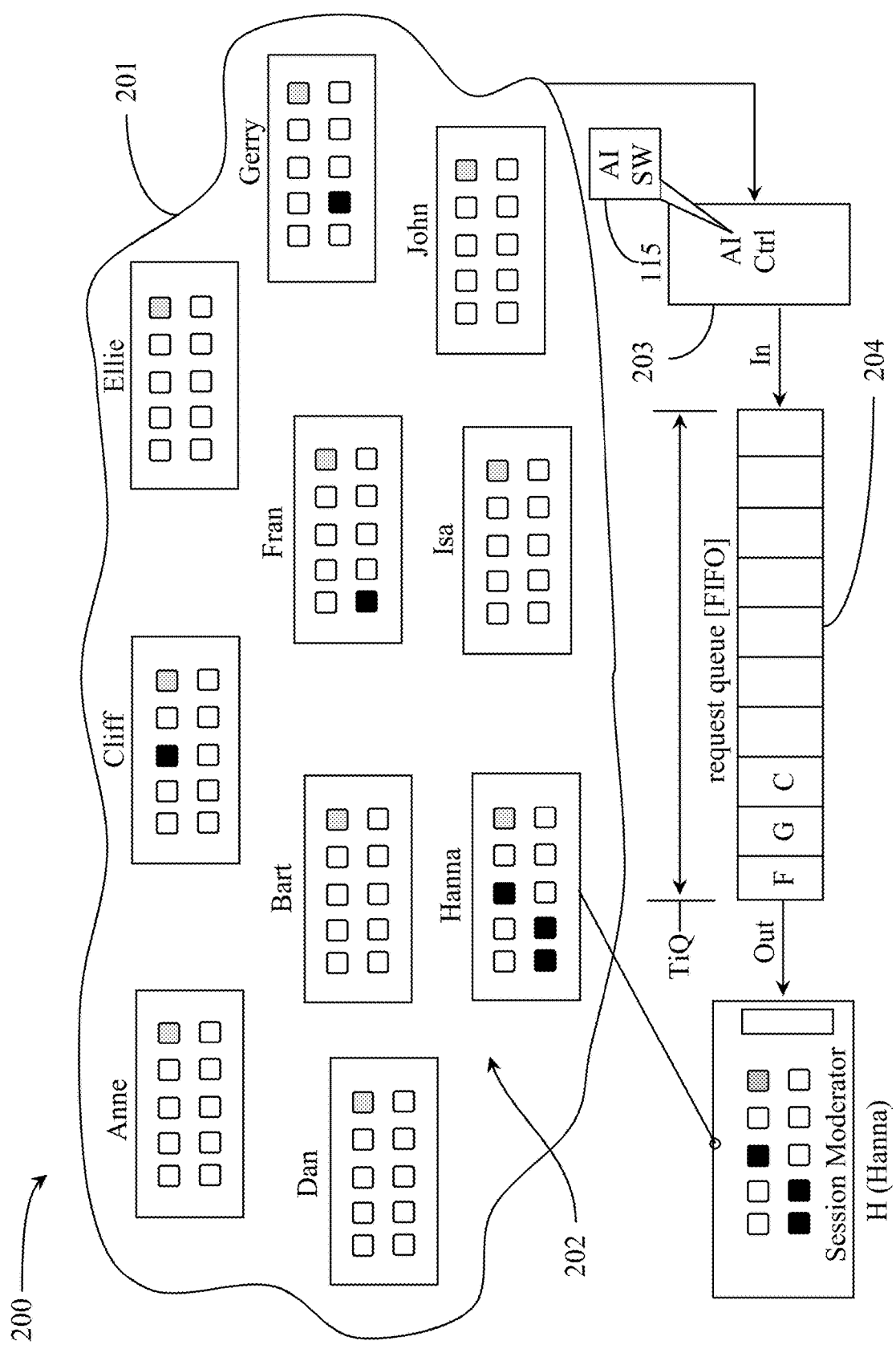
FIG. 2 is a block diagram depicting a telepresense queue structure operated by a telepresence AI controller.

FIG. 2 is a block diagram 200 depicting a telepresense queue structure operated by a telepresence AI controller. Block diagram 200 depicts a telepresence video/audio teleconference session 201. In this example there are ten session clients 202 depicted as displays showing all ten participant feeds to each participating user. The actual number of participants may vary widely depending on the type of telepresence session held and brokered by the server analogous to server 112 aided by SW 113.

In this embodiment, session 201 has a session moderator included in clients 202 referenced herein as Hanna. Hanna may be the person responsible for calling a session and in determining the invitees to the session as well as date and time and subject matter. Session 201 may include communication sequences between participants and to the group as well as media presentations file sharing, etc.

In one embodiment Hanna as a moderator may have controls that other participants do not have such as an ability to moot individual feeds by excelling audio, masking video, booting a client from session, and other controls. As a moderator, Hanna may have access to information from the system that is not available to other participants.

One way to help control the flow of session 201 is to provide a participation queue referenced herein as request queue 204. In one basic implementation, queue 204 is a first-in-first-out queue based in the brokering server analogous to server 112 of FIG. 1 aided by SW 113. Queue 204 may be part of SW 113 and available to any telepresence session. Request queue 204 may be monitored by event, such as request in queue and time stamp (TS) such as time of the request. Queue 204 may include as many slots as there are participants in a telepresence session and may be length adjusted by SW controller referenced herein as an artificially intelligent (AI) controller 203 supported by hardware and aided by an AI SW program 115. AI SW may also be a part of or an extension to SW 113 running on server 112 without departing from the spirit and scope of the present invention.

AI controller 203 is represented as a piece of dedicated hardware in this embodiment for discussion purposes only. In actual practice, AI controller 203 may be implemented as SW instruction to a brokering server such as part of SW 115 hosted on back-end server 114 in cloud 111 of FIG. 1 above. AI controller 203 aided by SW 115 has access to all the feed data of session 201. More particularly, all participant feeds may be selectively monitored by AI controller 203 running an algorithm that filters each client incoming feed in real time for visual events (anomalies), audio events (anomalies), data input actions, or environmental anomalies, that may match stored conditions or variables like existing rules and meta data held by the system that may be equated to AI functions or actions initiated toward participating clients based on feed evaluation or feed analysis from a visual or audio sense.

Queue 204 is a FIFO request queue whereby any client may request to enter queue 204 to make an audio or audio/visual presentation in alignment with session rules. Queue 204 includes a time in queue (TiQ) measurement that the system may use to locate clients, for example first and second in queue. Time stamps may be recorded for each client that enters queue 204 where the client may see place in queue in real time and may see who else is in queue. In this example for reference, there are three clients currently registered in queue. Moderator Hanna is expanded in view as the first client 202 to receive information out of queue as a moderator.

In this example, FIFO queue 204 is stacked by AI controller 203 aided by SW 115. In this example, displays for session 200 all show the same clients 202 in alphabetical order. For example, Anne takes the top row left in display, Bart takes the next square over followed by Cliff, and so on for discussion purposes. Clients may be displayed in any order. In one embodiment clients 202 fill the session displays as they log in via time stamp evaluation at the server.

Request queue 204 contains three clients in queue Fran, followed by Gerry, followed by Cliff in that order. In one embodiment this is because of the order those three clients input a request to speak for example. TS data at the time of input may determine order of display on the session screen if all participants are displayed on screen. In some embodiment, where there are many more clients such as a graduation, several squares in the display may be populated while some number is not unless a request is made to contribute. Windows sizing may be practiced in real time such that speakers' boxes showing video of the speaker is magnified over the other squares in the display.

Client feeds are delivered to a back-end server like server 112 where they may be passed over to the AI controller for monitoring of each feed by the controller. In this case, all the client's displays show Hanna as currently speaking, the video box of Hanna in the display, being grayed out. In this case Hanna has asked the group to provide some input relative to what she is speaking about. Fran is the first client to input a desire to respond to Hanna's request. Therefore, Fran is first-in and first-out of queue or the next client allowed to speak or should be speaking next.

Gerry is behind Fran and Cliff is behind Gerry. In this example Hanna can see all the queued client's as green screens or with some other visual indication of queue state on Hanna's display device. Hanna is still grayed out because she is still addressing the group. All the other clients may have Hanna's box grayed out in their displays of the session indicative that she has not quite finished speaking. When Fran begins speaking Hanna's video box will no longer show gray and Fran's video box will show gray as current contributor, hopefully uninterrupted.

In this example, Fran, Gerry, and Cliff all see their own place in queue, perhaps by the video box turning a color like green or perhaps some other color. In one embodiment colors change as a client moves through queue 204. In another embodiment, Time in Queue is reported for every client in queue. Queue 204 may have a time out imposed on it meaning a total time from a client hitting the back of queue 204 until the client should be predicted to be contributing actively by speaking or other contributions. This might be regulated by allowing a specific time for each client to speak or contribute to the session once they are out of queue.

In this embodiment, clients who have not requested queuing only see Hanna's box grayed because she is speaking. When a client requests queue, then that client will see his or her queue position including estimated time out of queue. In one embodiment queue time estimates may change while the client is waiting in queue and may be communicated to that client in session. Feeds come into the server from the network and are directed through the AI controller, which looks for precursor events that may trigger some action from the controller. In one embodiment where a moderator is used, the moderator may have an override capability over AI suggestions to change queue priority, increase or decrease TiQ, scrap current queue load, and so on.

AI controller aided by SW 115 may monitor each client feed considering the current queue rules and state. For example, if Cliff attempts to contribute before he is out of queue by speaking, then the AI controller aided by SW 115 may suddenly moot Cliff's audio and may send a notification to Cliff reminding him that he is still in queue and does not yet have the go ahead to contribute. If Fran is speaking and goes past an allowed time for response, then the AI controller 204 may cut the audio and video of Fran from being served back into the network to the other clients and may notify Gerry to begin speaking. In this case, the interruption in the form of audio is mitigated at the first hint of audio by a client not authorized to speak yet.

AI monitoring may use optical recognition characteristics to monitor client video for any anomalies that may match documented trigger metrics for mooting a video feed. There are many different types of telepresence capable video/audio teleconferences. Therefore, there may be different types of session metrics, rules, and queue sizes/times. AI monitoring may see gestures before a moderator might see them. AI monitoring may see offensive material displayed before it is broadcast to other clients. For example, if a client tries to prank a session then that client feed is mooted at first hint by the AI controller of something inappropriate in the video content. AI controller 203 may optically determine if the right or wrong person is in session using face recognition, or when there is more than one person in one feed. Unexpected occurrences may be mitigated by AI controller 203 aided by SW 115 before data reaches displays of client devices.

In this example, there are seven empty queue positions that could be filled by the remaining clients, such as if they all were expected to contribute. In one embodiment, Hanna the moderator may override AI-set queue order and set up a priority in queue of clients the moderator wants to hear from in a specific order. Metrics may be created according to the type of session and the nature of interaction sequences.

Figure 3:
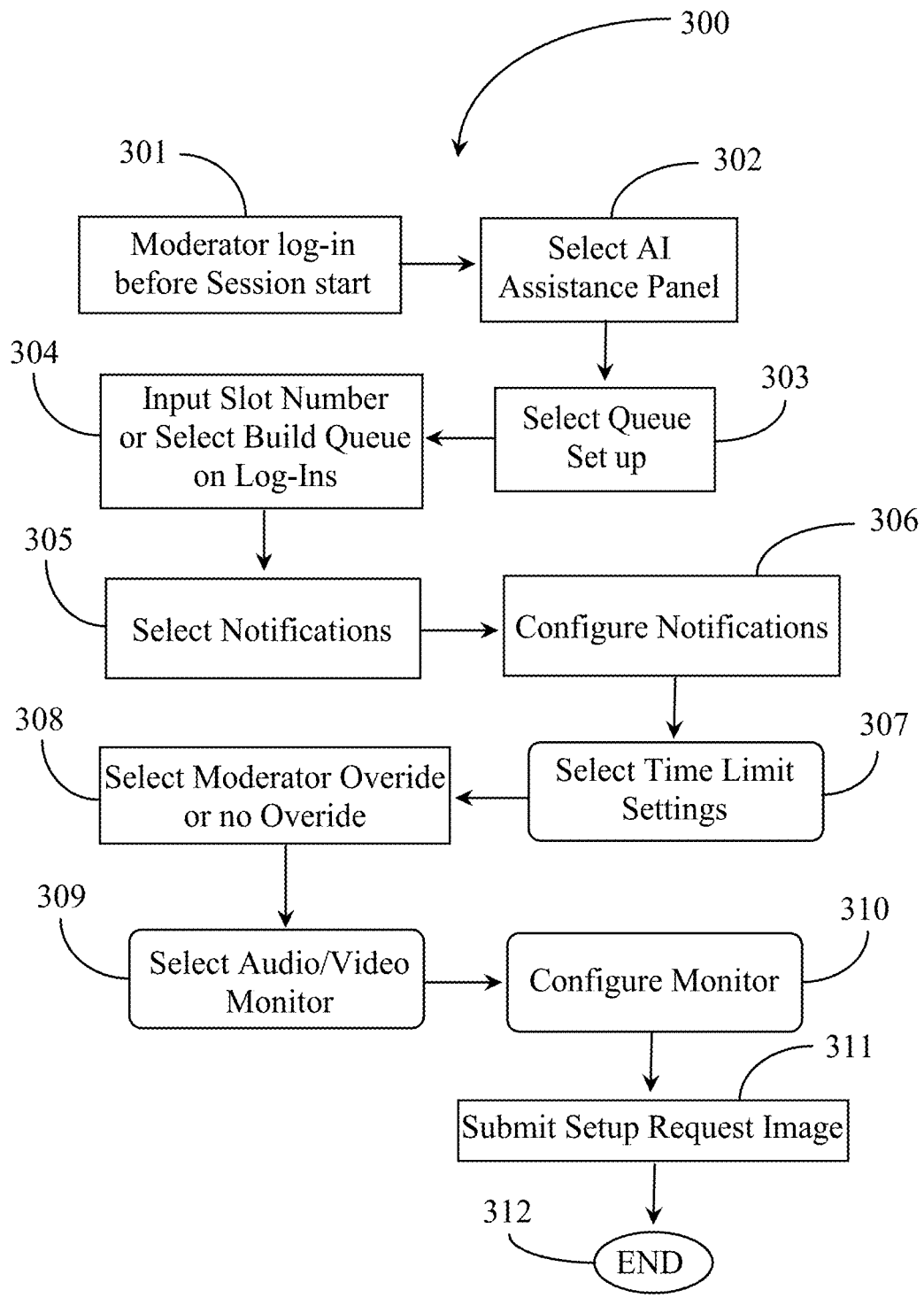
FIG. 3 is a process flow chart depicting steps for setting up AI assistance for a zoom session.

FIG. 3 is a process flow chart 300 depicting steps for setting up AI assistance for a zoom session. At step 301 a moderator may log-in to the system some time before session start to create a session, to set last minute metrics for a scheduled session created beforehand. At step 302, the moderator or client setting up the session may select AI assistance by selecting an icon or link. At step 303, the moderator may select queue set up.

At step 304, the moderator may set the queue size by ordering the number of slots in queue or the memory it will reserve for full queue. The queue size depends upon the size (number of clients) that will be in session and allowed to request queue. In one embodiment, the moderator may select an option that lets the AI controller build the queue as needed. This option reserves queue space per number of client's logging into the session. The queue may be a virtual queue and may not require a lot of memory.

In step 305, the moderator may select an notifications option to select which type of notifications the moderator wishes to receive and how they will be pushed to the moderator. At step 306, the moderator may configure notifications. For example, a notification may be that speaking time is almost up and next speaker is on deck and about to proceed. In one embodiment a color screen scheme is provided to color the video boxes of the client's visible to the moderator on the moderator's display. For example, flashing a green screen may notify the moderator that the client with the transparent green screen is set to come out of queue to contribute to the session. A client showing a transparent gray screen may mean that that client was speaking or otherwise contributing to the session and that client is about run out of allowed time.

Other notifications may be pushed to other clients besides the moderator. For example, a client in queue may see his or her own video box turn a transparent color while waiting to contribute. At step 307, the moderator may select time limit settings if the moderator wants to put time limits on time to speak for client's, time in queue for client's, time for the overall meeting, or time for treating each of several subject matters addressed in a meeting. At step 308, the moderator may select an option that enables the moderator to override an automated situation. For example, a moderator may override queue placements by the system. A moderator might empty or flush a queue and start another topic for discussion.

At step 309, a moderator or person setting up a video teleconference session may select an option for setting preferences for audio and video monitoring by the AI controller. At step 310 the moderator may configure the monitor. For example, the moderator may decide to monitor video and audio or just audio but not video. Monitoring may be switched on or off by the moderator. The moderator may select whose video and audio is monitored. For example, only monitor clients in queue and in process of contributing. In one embodiment, a moderator may order the system to monitor video only until the client is contributing.

The AI system may leverage queue intelligence and other rules that may be static or dynamic (created for instant session) to make decisions about mooting or not mooting client feeds, or whether a client should be mooted entirely or ejected from the session, given more time to contribute, etc. In step 311, the moderator or person charged with scheduling the meeting may submit a set up request image containing all the details to the system for implementation. At step 312 the process may end.

If a host or moderator sets up a meeting, typically that host or moderator may log-in to a schedule session early and make any last-minute changes in AI monitoring, queue size, etc. In one embodiment, a session is impromptu meaning that a moderator or other client calls for a dynamic session and has a list of session invites sent out where the session begins after enough clients log-in to the session. It is noted herein that there does not have to be a moderator or a leader of a group conducting a video/audio teleconference. In one embodiment there is no moderator. In this embodiment all clients of the session may see all the other client's session states, such as if they are in queue, if they are speaking, if they are sharing a file, if they are distributing an email, if they are playing a video clip or a power point slide etc.

Figure 4:
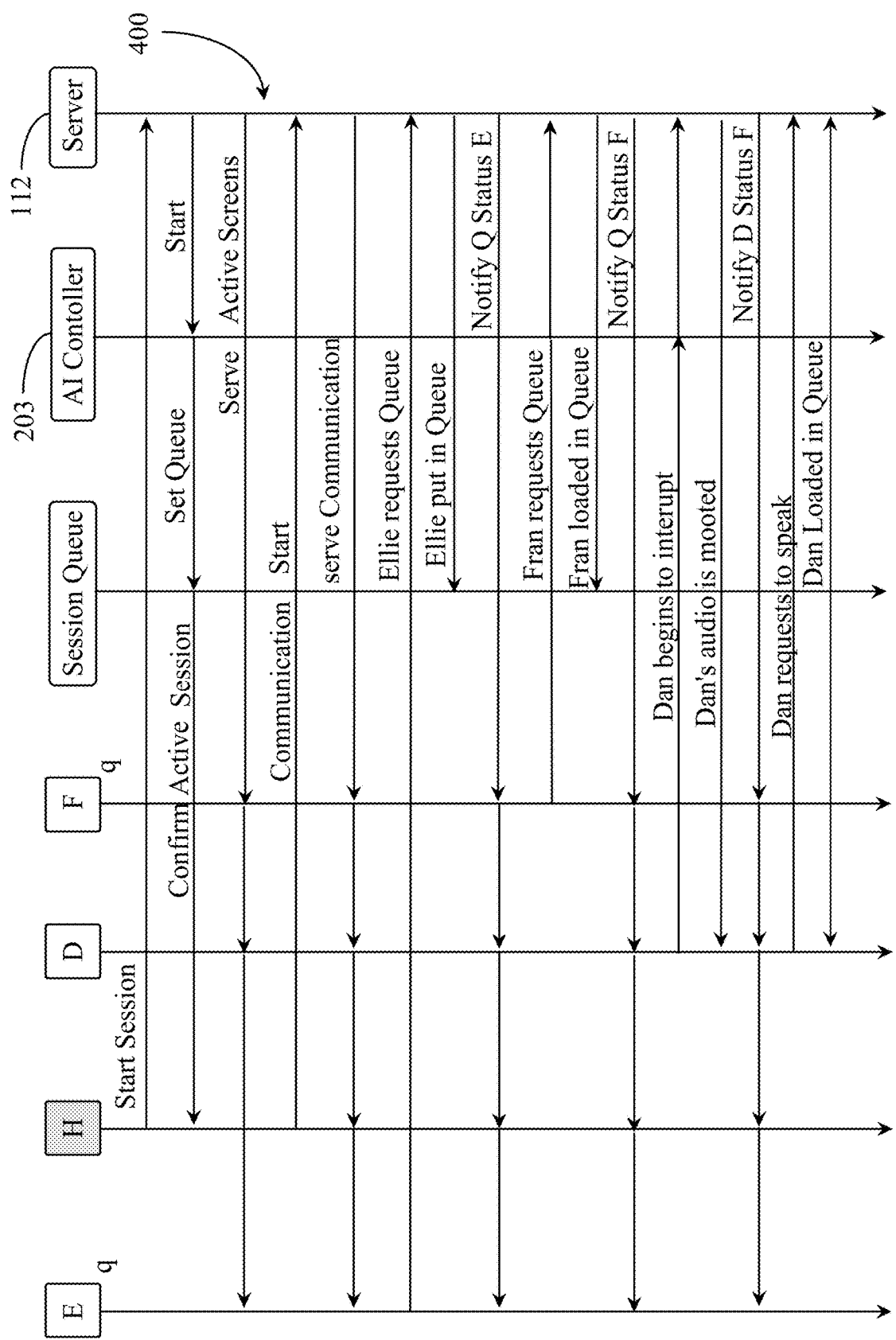
FIG. 4 is an interaction sequence diagram depicting a virtual collaborative session and activity utilizing a queue.

FIG. 4 is an interaction sequence diagram 400 depicting a virtual collaborative session and activity utilizing a queue. In this embodiment, there are four clients labeled E (Ellie), H (Hanna), D (Dan) and F (Fran). The small letter q may designate the clients that are in queue (Ellie, Fran). Session queue 204 is depicted as a sequence node, AI controller 203 is depicted as a sequence node, and server 112 is depicted as a sequence node. A sequence node is simply a node that can send or receive data on a network.

Hanna may be a moderator having a transparent gray screen. Ellie and Fran are placed in queue during sequence interaction depicted by the letter q. In actual practice a transparent coloring may appear in their video boxes displayed to clients to indicate they are in queue. It is noted herein that any client requesting queue may also drop out of queue for example, if the client does not want to wait or if the contribution the client had was the same as a client ahead in queue and wants to avoid redundancy.

Hanna may start a session by logging into server 112 and setting up the session including inviting participants. In one embodiment, Hanna may have participants already free and may start a session just before a time that the rest of the participants will join the session. Server 112 may confirm the session to Hanna, start the AI controller 203 to monitor feeds, and may set the session queue 204 according to Hanna's previous selections, or as participants log in.

It is assumed that Ellie, Dan, and Fran have all logged onto the session held in server 112. Server 112 May serve active screens depicting session participant windows or boxes displaying participant video and audio. Hanna, as moderator may begin a session contribution by speaking or communication to the rest of the participants. Server 112 serves Hanna's communication to all participants.

Ellie may request queue and server 112 may respond by putting Ellie in queue and then notifying all other participants about Ellie's queue state. Fran may also request queue where server 112 puts Fran in queue and then notifies all the other participants that Fran is now in queue. Request for queue may be equivalent to raising your hand to speak after Hanna is finished speaking. Notice of the queue state informs other participants not to talk if not queued out by AI controller 203. A request for queue includes a time stamp indication of exactly when queue was requested. If two or more participants make queue requests at a similar or the same time, TS information may be used by AI controller 203 to sort out the queue order.

In one embodiment where the session is an interview or a question answer session such as a politician answering questions posed by constituents, queue time may be very short and the first in queue will be the first out of queue and can ask the question. So many participants may enter queue and wait in line until they are able to speak. AI analyzes each individual client feed to look for any matching conditions that might trigger the controller to moot video and or audio of the flagged feed.

In this interaction sequence, Dan who is not in queue begins to interrupt the speaker Hanna. Dan's feed is monitored by AI controller 203 and AI controller 203 picks up Dan's interruption and moots Dan's video/audio feed Server 112 notifies all the other participants of Dan's mooting. In one embodiment Dan's video box turns black or otherwise indicates no video/audio to present. Dan may still request queue though his video/audio feed is mooted. Server 125 may put Dan in and notify status of Dan in queue. Dan may or may not have full video and audio restored while in queue.

However, when Dan is out of queue his video and audio may be seen by all or the participants. In the case of audible interruption, AI controller 203 detects the interruption before broadcasting Dan's feed to the participants. AI controller moots the feed by redirecting the feed, so it is not broadcast or deleting the feed data immediately after detecting the audio representing Dan's interruption.

Figure 5:
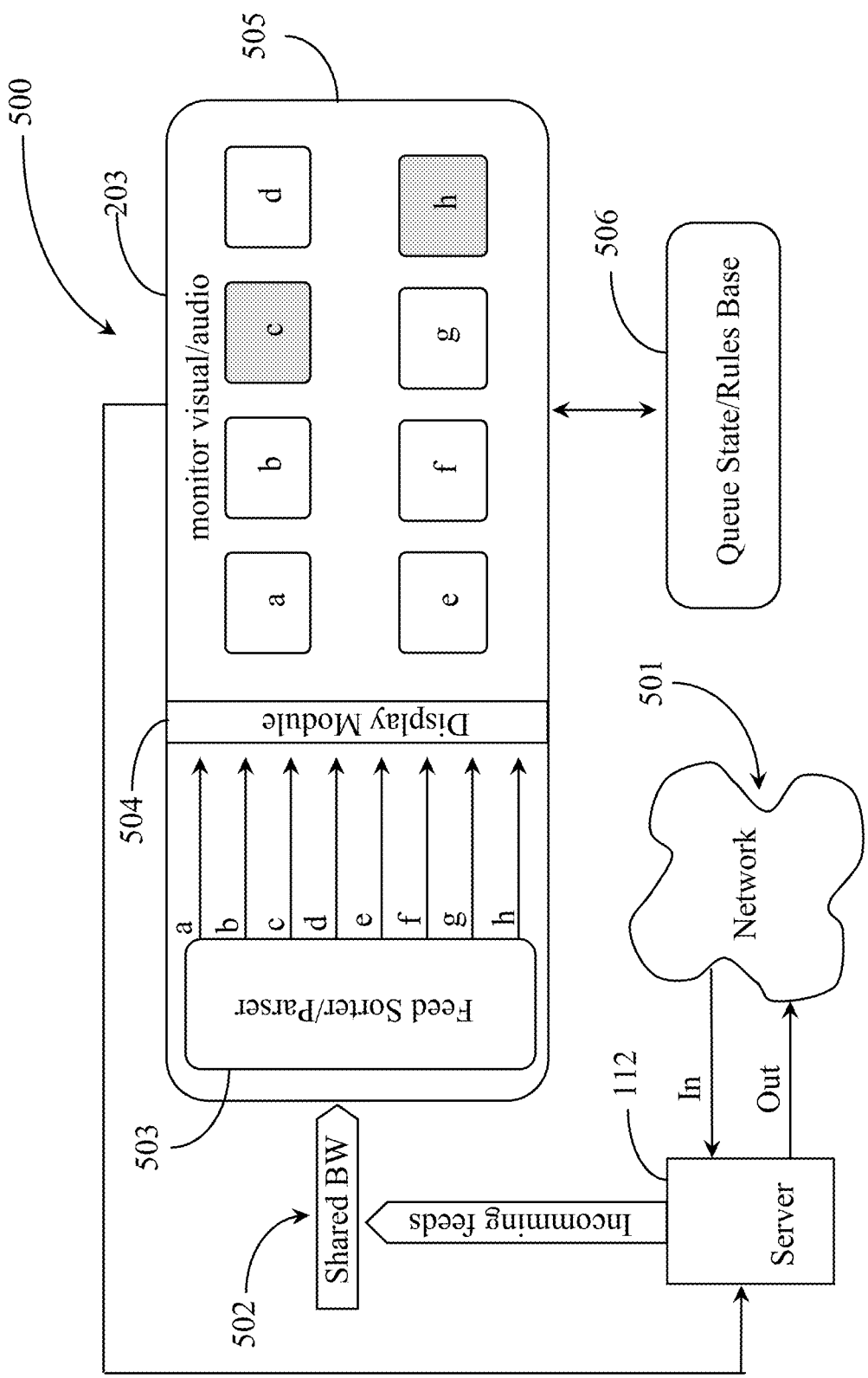
FIG. 5 is a block diagram depicting feed monitoring of session participants by the AI controller.

FIG. 5 is a block diagram 500 depicting feed monitoring of session participants by the AI controller. Network 501 represents the Internet network hosting server 112. Feeds for participants a through h in logical display in a feed monitoring interface 505. Individual feeds come into server 112 from network 501 and are directed to feed monitoring as shared bandwidth data 503 into a feed sorter and parser 503. Sorter/Parser 103 separates the individual feeds by address to a display module 504 that displays the separated feeds for monitoring. Audio and video may be monitored separately in AI controller 203 with optical recognition capability used to monitor the video portion while speech recognition may be used to monitor audio portions of each feed.

AI controller knows queue state for each participant including rules associated with speaking or contributing including linking that to queue outcome (only out of queue may speak). Queue state and rules may be accessed in data base 506. Therefore, if AI controller detects audio, it may quickly determine if the detected event is an interruption according to queue state and rules. If AI controller detects video interruption or a visible altering of a monitored video screen, it may quickly determine based on queue state and rules base if the anomaly was part of normal session protocol or some disruption born as a prank or hijack of the session.

In either case AI controller may moot audio and or video of the client that it came from preventing the other clients or participants in the session from being disrupted. In this sense, the AI controller functions dynamically and makes determinations without the aid of an operator. The moderator may select to be able to override an AI determination and may elect to receive a notification from AI and confirm or deny the AI action without departing from the spirit and scope of the present invention.

In this example, AI controller 203 has flagged client c (Cliff) and has notified client h (Hanna) of the action taken. In some cases, unwanted back and forth chatter is created due to a latency in the network. Using a FIFO queue as a guide to who in session should be talking may be preferable. In a preferred embodiment advance visual notifications such as color change in video screens or boxes of clients in session are propagated through the network faster than the heavier video and audio feeds subject to quality of service (QoS) metrics practiced in the network.

Figure 6:
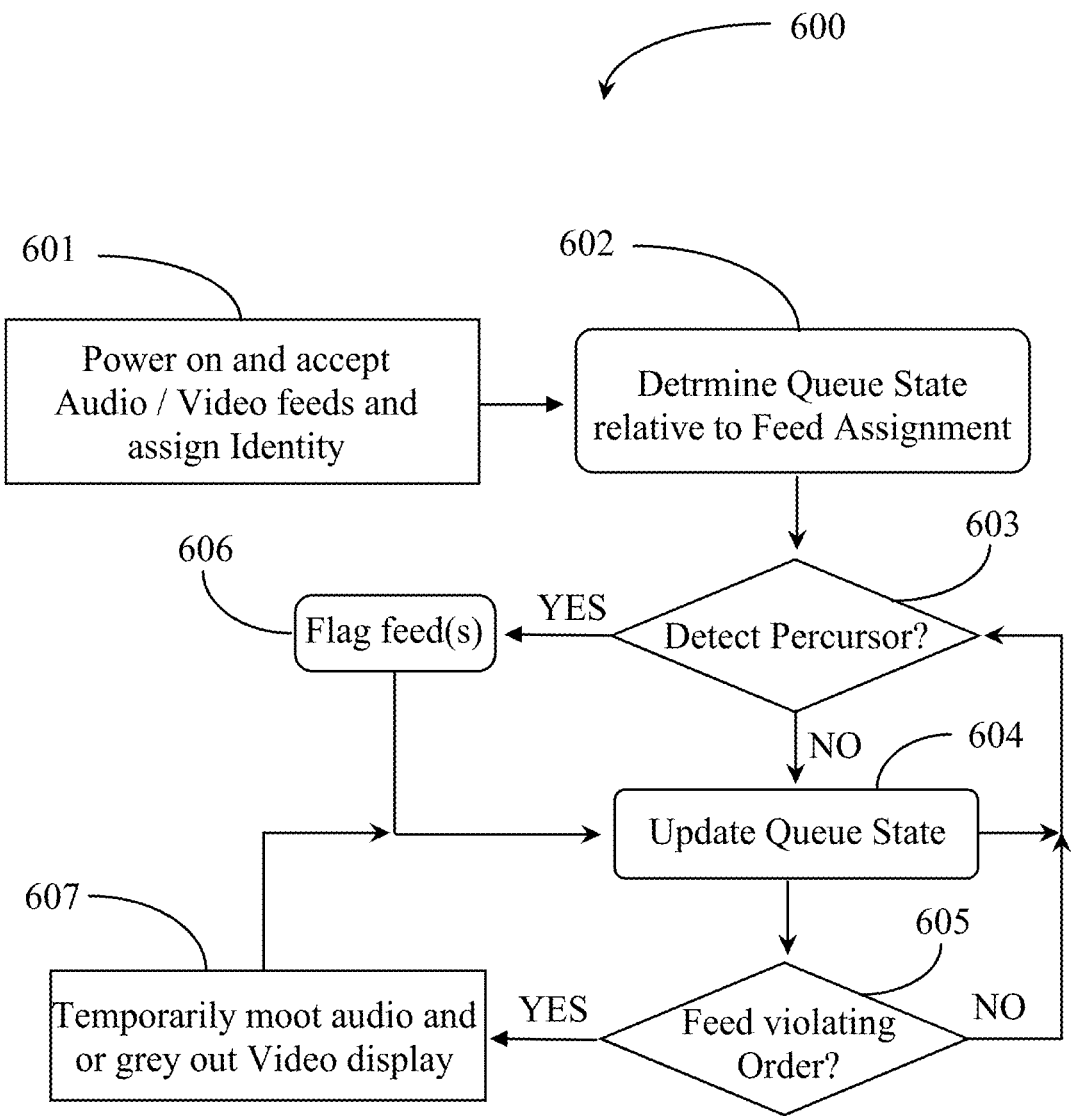
FIG. 6 is a process flow chart depicting steps for detecting an event precursor and applying mitigating action using AI.

FIG. 6 is a process flow chart 600 depicting steps for detecting an event precursor and applying mitigating action using AI. At step 601, the AI controller may power on or be started to monitor a session and may accept audio/video feeds of the clients before broadcast of those feeds back to all participants. At step 602, the AI controller may determine queue state relative to feed assignment. Queue state includes who is in queue and what queue position they are assigned. In one embodiment, the AI controller receives the queue requests and puts the session participants in queue. In one embodiment, queue state and rules based on session metrics are fed to the AI controller from a server database.

At step 603, the AI controller monitors all the feeds looking for video or audio persecutors to further interruption. This capability may involve one or more optical recognition systems and one or more audio or speech recognition systems. At step 603, if the AI controller does not detect anything in any of the feeds, the process may move to step 604 where the AI controller may refresh queue state to have the latest version. The process then loops back to step 603. If at step 603, the AI controller detects a precursor, then the process may move to step 606 where the AI controller flags the feed or feeds for action. The process may loop back to step 604 to refresh queue state to have the latest state to determine if there is a violation at step 605.

If at step 605 a feed violates order, the AI controller may temporarily moot audio of the feed in violation and may gray out or moot video. In this step other actions are also possible including dropping the feed from the system so no feed is propagated to the rest of the clients. In one embodiment, only audio is mooted. In one embodiment, a client might be booted from the session altogether by requesting the server to block the incoming feed of the client.

The AI controller may also redirect a feed to a dummy destination that is in the server where that data may be archived for future reference. In one embodiment, the AI controller may learn patterns, for examples from sessions that happen regularly and that include clients who are regular participants in those sessions. An example would be a board meeting held once a month, a sales meeting. In these cases, the AI controller may develop probability statistics and use them predictively to add weight to decisions it makes.

It will be apparent to one with skill in the art of video/audio media monitoring that the video conference telepresence controller of the present invention may be provided using some of or all the elements described herein without departing from the spirit and scope of the invention. It will be apparent to the skilled person that the arrangement of elements and functionality thereof is enabled in one or more embodiments, each exemplary of an implementation of the present invention. It will further be apparent to one with skill in the art that there are different ways the elements may be arranged and methods of software implementation without departing from the spirit and scope of the invention the invention is limited only by the breadth of the claims below.

The invention claimed is:

1. A video conference telepresence controller comprising:
   a first set of coded instructions written on a non-transitory medium coupled to a server on a network, the first set of instructions commanding the server to create and maintain a FIFO queue structure for clients of a video conference telepresence session, enabling a plurality of clients to request to be placed in queue for speaking time in the conference, the clients automatically allowed to speak in order of requesting and entering the queue by the controller for a set amount of time, each;

a second set of coded instructions written on the non-transitory medium, the second set of instructions commanding the server to monitor audio/video feeds one each received at the server for each one of the clients of the video conference telepresence session hosted by the server and to identify each one of the clients of those feeds, the monitoring at least for adherence to rules regulating the set amount of speaking time;

a third set of coded instructions written on the non-transitory medium, the third set of instructions commanding the server to detect precursor events that lead to the client speaking past the set amount of time for speaking time in one or more of the monitored feeds based on set queue state and the set amount of time, flagging the feeds having the detected precursor events for action; and a fourth set of coded instructions written on the non-transitory medium, the fourth set of instructions commanding the server to perform an interruption, including at least automatically muting the feed, redirect, or deletion of the one or more of the feeds flagged for action under the third set of instructions, prior to the client speaking past the set speaking time; wherein redirection of one or more flagged feeds is performed by rerouting the feed to a separate database for logging and canceling the feed or feeds relative to broadcast back over the network to client devices, wherein the data logged over time teaches the controller a pattern and serves as knowledge to improve the accuracy of the controller.

2. The video conference telepresence controller of claim 1, wherein the controller has access to one or more optical recognition technologies for detecting visual events, and one or more speech detection and recognition technologies for detecting language events.

3. The video conference telepresence controller of claim 1, wherein the network is the Internet network including any connected sub-networks.

4. The video conference telepresence controller of claim 1, wherein the rules include a time limit for time in queue and the fourth set of instructions performs the interruption prior to exceeding the time limit.

5. The video conference telepresence controller of claim 1, wherein the queue structure is dynamic and built before or during an active telepresence session.

6. The video conference telepresence controller of claim 1, wherein one of the clients participating in session is a session moderator.

7. The video conference telepresence controller of claim 1, wherein the precursor event is a client talking out of turn based on queue state and session rules.

8. The video conference telepresence controller of claim 1, wherein the precursor event is a client displaying an alternative visual to the client profile out of turn based on queue state and session rules.

9. The video conference telepresence controller of claim 6, wherein the moderator overrides actions taken by the controller.

10. The video conference telepresence controller of claim 1, wherein interruption of one or more flagged feeds is performed by cancelling the feed or feeds broadcast back onto the network to the clients in session.

* * * * *